US010236728B2

United States Patent
Amari et al.

(10) Patent No.: US 10,236,728 B2
(45) Date of Patent: Mar. 19, 2019

(54) ELECTRIC VEHICLE

(71) Applicant: HONDA MOTOR CO., LTD., Tokyo (JP)

(72) Inventors: Yusaku Amari, Wako (JP); Tomoaki Nakagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 96 days.

(21) Appl. No.: 14/331,179

(22) Filed: Jul. 14, 2014

(65) Prior Publication Data
US 2015/0022144 A1 Jan. 22, 2015

(30) Foreign Application Priority Data

Jul. 18, 2013 (JP) .................................. 2013-149320

(51) Int. Cl.
H02J 50/90 (2016.01)
H02J 50/12 (2016.01)
(Continued)

(52) U.S. Cl.
CPC ............ *H02J 50/90* (2016.02); *H02J 7/0027* (2013.01); *H02J 17/00* (2013.01); *H02J 50/12* (2016.02); *H02J 50/80* (2016.02); *Y02T 10/7055* (2013.01)

(58) Field of Classification Search
CPC ....................................................... H02J 7/025
See application file for complete search history.

(56) References Cited

U.S. PATENT DOCUMENTS 8,844,817 B2 * 9/2014 Glanzer ................. G06K 7/082
235/375
8,878,495 B2 * 11/2014 Perisic .................. H01M 10/44
320/137
(Continued)

FOREIGN PATENT DOCUMENTS

FR 2976416 A * 12/2012 ................ H02J 7/00
JP 2010-252497 11/2010
(Continued)

OTHER PUBLICATIONS

FR2976416 translation,Serge et al, Regulation system for use in e.g. lithium-ion battery to regulate charge of battery, Dec. 2012.*
(Continued)

*Primary Examiner* — Robert J Grant
*Assistant Examiner* — Tynese V McDaniel
(74) *Attorney, Agent, or Firm* — Mori & Ward, LLP

(57) ABSTRACT

An electric vehicle includes a charging circuit and a control apparatus. The charging circuit includes a reception coil and a battery. The reception coil is configured to receive wirelessly AC power transmitted from an electrical transmission circuit outside of the electric vehicle. The battery is configured to be charged with power obtained by rectifying the AC power received by the reception coil. The control apparatus includes a battery voltage detector and a charging current value setting device. The charging current value setting device is configured to set a charging current value at which the battery is charged in accordance with voltage of the battery detected by the battery voltage detector. The charging current value is set so that a load resistance value of the charging circuit is constant in a period during which the battery is being charged.

21 Claims, 11 Drawing Sheets

(51) Int. Cl.
*H02J 50/80* (2016.01)
*H02J 7/00* (2006.01)
*H02J 17/00* (2006.01)

(56) References Cited

U.S. PATENT DOCUMENTS

| | | | | |
|---|---|---|---|---|
| 2011/0254377 | A1* | 10/2011 | Wildmer | B60L 11/182 307/104 |
| 2012/0242284 | A1* | 9/2012 | Wheatley, III | H02J 17/00 320/108 |
| 2013/0038282 | A1* | 2/2013 | Shimokawa | H01F 38/14 320/108 |
| 2013/0127415 | A1* | 5/2013 | Ohtomo | B60L 3/003 320/109 |
| 2013/0227319 | A1* | 8/2013 | Ye | G06F 1/26 713/320 |
| 2014/0132208 | A1* | 5/2014 | Fisher | H02J 7/025 320/108 |
| 2014/0375256 | A1* | 12/2014 | Lee | H02J 7/025 320/108 |

FOREIGN PATENT DOCUMENTS

| | | | | |
|---|---|---|---|---|
| JP | 2011-250555 | | 12/2011 | |
| JP | 2012-182887 | | 9/2012 | |
| JP | 2013-528043 | | 7/2013 | |
| JP | 2014075884 A | * | 4/2014 | B60L 11/182 |

OTHER PUBLICATIONS

Japanese Office Action for corresponding JP Application No. 2013-149320, dated Aug. 16, 2016 (w/ English machine translation).

* cited by examiner

ELECTRIC VEHICLE

CROSS-REFERENCE TO RELATED APPLICATIONS

The present application claims priority under 35 U.S.C. § 119 to Japanese Patent Application No. 2013-149320, filed Jul. 18, 2013, entitled "Electric Vehicle." The contents of this application are incorporated herein by reference in their entirety.

BACKGROUND

1. Field

The present disclosure relates to an electric vehicle.

2. Description of the Related Art

Japanese Unexamined Patent Application Publication No. 2011-250555 discloses a wireless power transmission system where electric power transmission and charging are performed by electromagnetic coupling between an external power supply side coil, and a reception side coil within the vehicle. A reception device within the vehicle includes an impedance rectifier to adjust impedance of a resonance system made up of a transmitting resonator and a receiving resonator.

Japanese Unexamined Patent Application Publication No. 2011-250555 discloses, in paragraph 0060 and FIGS. 1 and 3, realizing efficient power transmission by the receiving device adjusting impedance of the impedance rectifier, based on electric power information. This electric power information is a detection value of reflected power received from the power transmission facility.

Japanese Unexamined Patent Application Publication No. 2012-182887 discloses a wireless power transmission system which performs charging from power transmission by magnetic coupling between a power supply side coil and a reception side coil. It is stated therein that power transmission efficiency changes depending on the charging power supplied from the power supply side to the reception side circuit, and the state of charge (SOC) of the battery, which indicates the amount of charge remaining (load voltage), so the secondary battery is charged in a state where power transmission efficiency is not very high.

Accordingly, Japanese Unexamined Patent Application Publication No. 2012-182887 proposes, in paragraphs 0010, 0011, and 0013, a wireless power transmission method and wireless power transmission device, including a process of detecting charging power, and a process to change the resistance ratio based on the detected charging power so that the power transmission efficiency between the power supply side coil and reception side coil will be high. This aims to solve the problem in which power transmission efficiency between the power supply side coil and reception side coil drops under constant voltage control, due to the charging power being reduced when switching from constant current control to constant voltage control to charge the secondary battery.

SUMMARY

According to one aspect of the present invention, an electric vehicle includes a charging circuit and a control device. The charging circuit includes at least a reception coil and a battery. The reception coil is configured to receive, by wireless power transmission, AC power transmitted from an electrical transmission circuit outside of the vehicle. The battery is charged with power obtained by rectifying the AC power received by the reception coil. The control device includes a battery voltage detecting unit and a charging current value setting unit. The battery voltage detecting unit is configured to detect voltage of the battery. The charging current value setting unit is configured to set a charging current value at which to charge the battery, in accordance with the voltage of the battery detected by the battery voltage detecting unit. The control device sets the charging current value so that a load resistance value of the charging circuit is constant, at the time of continuing charging of the battery.

According to another aspect of the present invention, an electric vehicle includes a charging circuit and a control apparatus. The charging circuit includes a reception coil and a battery. The reception coil is configured to receive wirelessly AC power transmitted from an electrical transmission circuit outside of the electric vehicle. The battery is configured to be charged with power obtained by rectifying the AC power received by the reception coil. The control apparatus includes a battery voltage detector and a charging current value setting device. The battery voltage detector is configured to detect voltage of the battery. The charging current value setting device is configured to set a charging current value at which the battery is charged in accordance with the voltage of the battery detected by the battery voltage detector. The charging current value is set so that a load resistance value of the charging circuit is constant in a period during which the battery is being charged.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
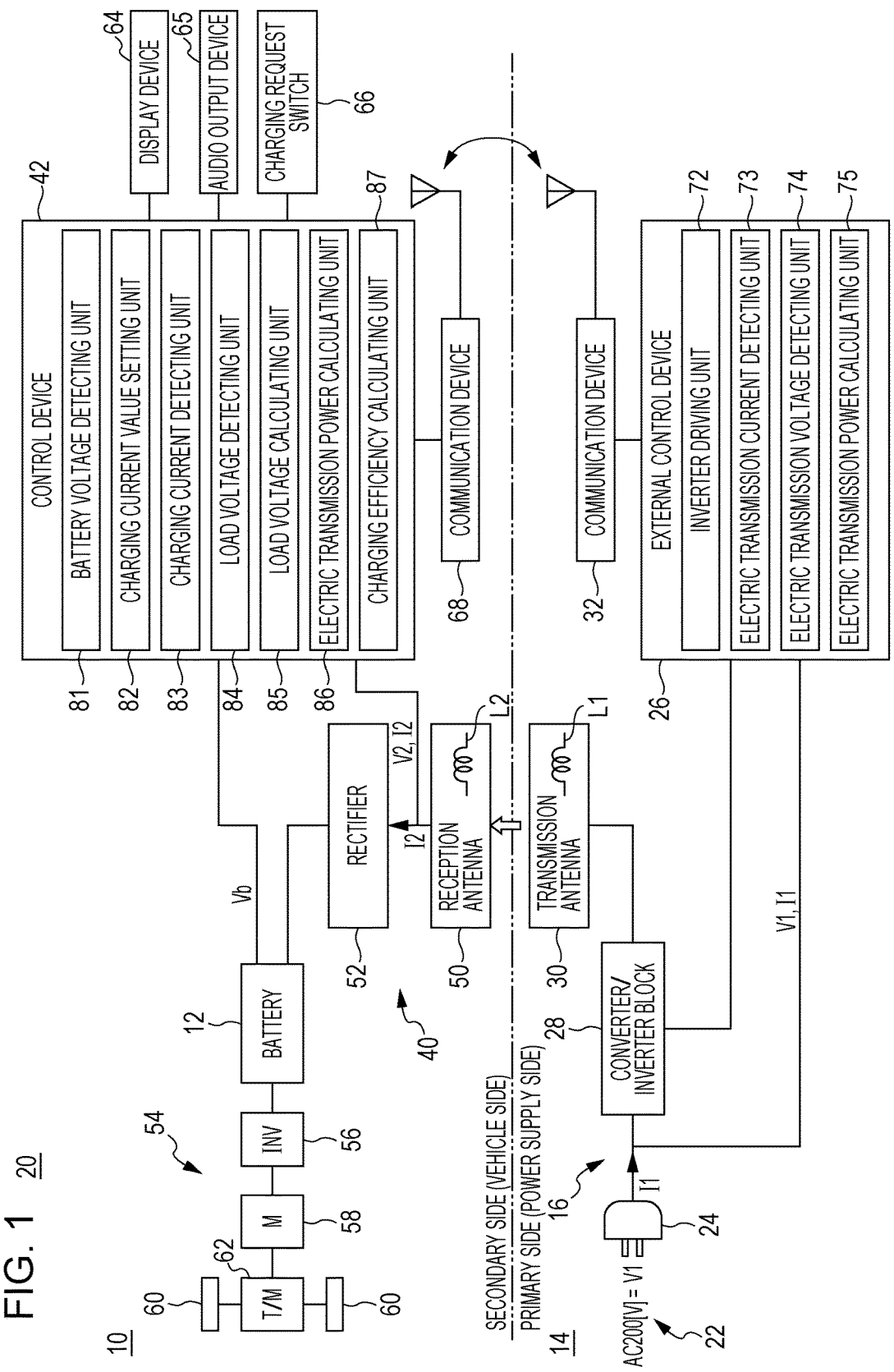
FIG. 1 is a schematic configuration diagram of a wireless charging system which charges a battery installed in an electric vehicle according to an embodiment.

The embodiments will now be described with reference to the accompanying drawings, wherein like reference numerals designate corresponding or identical elements throughout the various drawings.

Embodiments relating to an electric vehicle according to an embodiment of the present disclosure will be described in detail with reference to the attached drawings. FIG. 1 illustrates a wireless charging system 20 configured including an electric vehicle 10 according to the present embodiment, and an external charging device 14 which charges a battery 12 such as a lithium ion battery or the like, installed in the electric vehicle 10. In FIG. 1, components above the two-dot dashed line are components of the electric vehicle 10 which is the secondary side (vehicle side) and components below the two-dot dashed line are components of the external charging device 14 which is the primary side (power supply side).

Figure 2:
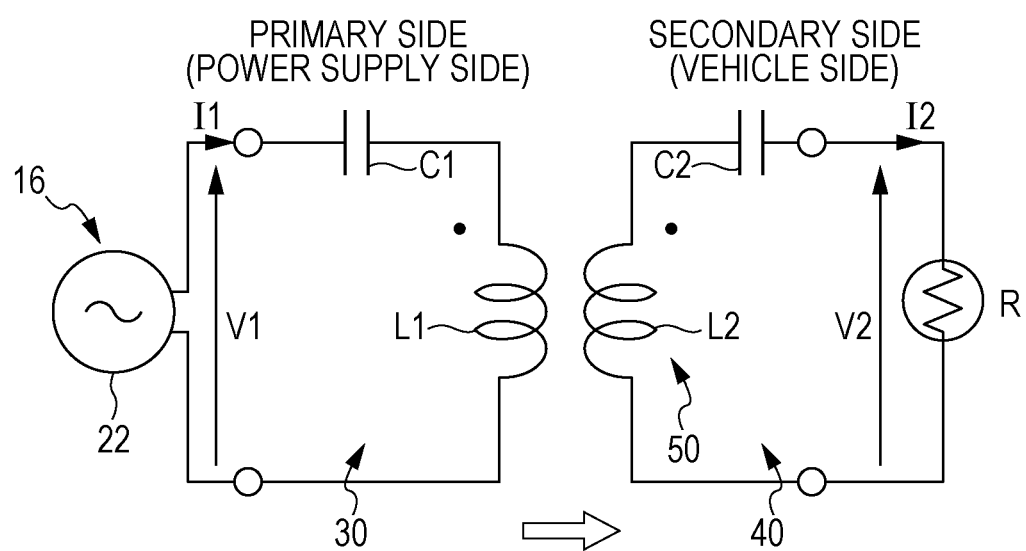
FIG. 2 is a simplified equivalent circuit diagram of the wireless charging system.

FIG. 2 is a simplified equivalent circuit diagram of the wireless charging system 20 illustrated in FIG. 1. While magnetic resonance is exemplified as the wireless power transmission method according to the present embodiment, the present disclosure is not restricted to magnetic resonance, and may also be applied to wireless charging using magnetic inductance.

In FIGS. 1 and 2, the external charging device 14 which is the primary side (power supply side) basically made up of an electrical transmission circuit 16 and an external control device 26.

The electrical transmission circuit 16 is configured including an AC 200 V (primary voltage $V1=200$ V) AC power source device 22, a converter/inverter block 28, and a primary side (power supply side) transmission antenna 30 (also referred to as transmitting antenna, power supply antenna, power supply side antenna), made up of a primary capacitor C1 for resonation and a power supply coil (primary coil) L1. The transmission antenna 30 is buried in the ground so as to be generally flush with the ground. A wireless charging position sign is set up nearby this position.

The external control device 26 detects the AC power of the AC power source device 22 as transmitted power P1 (where $P1=V1 \times I1$, V1 is primary voltage which is AC voltage, and I1 is primary current which is AC current), and performs driving control (on, off, and variable duty control) of the converter/inverter block 28. A communication device 32 is connected to the external control device 26.

On the other hand, the electric vehicle 10 basically is configured including, besides the battery 12, a electrical reception circuit 40 which is the secondary side (power receiving side, load side), a control device 42 which controls charging of the battery 12 from the electrical transmission circuit 16, and a vehicle propelling unit 54. Note that the control device 42 may be configured divided into a so-called battery electronic control unit (ECU), and a charge control device ECU which controls the overall wireless charging system 20.

The electrical reception circuit 40 is configured including a reception antenna (also referred to as power receiving side antenna, receiving antenna) 50 including a secondary capacitor C2 and reception coil (secondary coil) L2 for resonance, and a rectifier 52 which rectifies load power P2 which is AC power received by the reception coil L2. Load power P2 is expressed as the product of load voltage (Secondary voltage) V2 which is the output voltage of the electrical reception circuit 40, and charging current value I2 which is the output current of the electrical reception circuit 40 and is the secondary current ($P2=V2 \times I2$), and is detected by the control device 42. The reception antenna 50 is situated underneath the trunk (base) of the electric vehicle 10, for example.

The reception antenna 50 and transmission antenna 30 are each formed having a size no larger than the width of the vehicle. The electric vehicle 10 is moved so that the reception antenna 50 and transmission antenna 30 face one another, and the battery 12 is charged by wireless power transmission while stopped or parked.

The vehicle propelling unit 54 controlled by an unshown vehicle propulsion control device, which is unshown, is connected to the battery 12. The vehicle propelling unit 54 is made up of an inverter 56 which converts the voltage of the battery 12 (battery voltage) Vb to AC, a motor generator 58 for vehicle propulsion that is driven by the inverter 56, and a transmission 62 which transmits rotational force of the motor generator 58 to driving wheels 60. Description of detailed configuration and operations of the vehicle propelling unit 54 will be omitted here, since the present disclosure deals with wireless power transmission from an external electrical transmission circuit 16 when the electric vehicle 10 is stopped or parked.

The electric vehicle 10 according to the present disclosure is not restricted to use as an electric vehicle, which may be abbreviated to "EV", but may also be applied to hybrid automobiles including an engine, range extender automobiles, fuel cell automobiles which have fuel cells, and so forth.

The electric vehicle 10 includes the control device 42, to which is connected, in addition to the battery 12 and reception antenna 50, a display device 64 also serving as a multi-information display displaying gas mileage (power consumption), an audio output device 65 such as a speaker or the like, a charge request switch 66, and a communication device 68 which performs wireless communication with the external control device 26.

The control device 42 and external control device 26 are each made up of ECUs. An ECU is a calculator including a microcomputer, a central processing unit (CPU), read-only memory (ROM) including electrically erasable programmable read-only memory (EEPROM), random access memory (RAM), and also input/output devices such as an A/D converter, D/A converter or the like, a timer serving as a clocking unit, and so forth. The CPU reads out and executes programs stored in the ROM, thereby functioning as various types of function realizing units, such as a control unit, computing unit, processing unit, and so forth.

In the present embodiment, the external control device 26 making up the external charging device 14 functions as an inverter driving unit 72 which performs pulse width modulation (PWM) driving control of the converter/inverter block 28, i.e., duty control thereof, an electric transmission current detecting unit 73 which detects the primary current I1, an electric transmission voltage detecting unit 74 which detects the primary voltage V1, an electric transmission power calculating unit 75 which calculates the transmitted power P1 ($P1=I1 \times V1$) from the detected primary current I1 and primary voltage V1, and so forth. The vehicle-side control device 42 also has the electric transmission power calculating unit 75 in the form of an electric transmission power calculating unit 86. It is sufficient if this is provided to at least one side.

On the other hand, the control device 42 making up the electric vehicle 10 functions as a battery voltage detecting unit 81 which detects the voltage of the battery 12 (battery voltage) Vb, a charging current value setting unit 82 which sets the charging current value I2 in accordance with the detected battery voltage Vb, a charging current detecting unit 83 which detects the charging current value I2 flowing to a rectifier 52, a load voltage detecting unit 84 which detects the secondary voltage, which is voltage of the electrical reception circuit 40, as load voltage V2, a load voltage calculating unit 85 which calculates the load power P2 (P2=I2×V2) from the detected charging current value I2 and load voltage V2, an electric transmission power calculating unit 86, a charging efficiency calculating unit 87, and so forth. Note that the control device 42 further serves as a temperature detecting unit to detect the temperature of the battery 12 as well.

The rectifier 52 is a full-wave rectifier. Voltage drop of the rectifier 52 is negligible as compared to the battery voltage Vb, so while charging, the load voltage V2 can be reckoned to be equal to the value of the battery voltage Vb (V2=Vb). Accordingly, in the following description, the terms load voltage V2 and battery voltage Vb may be used interchangeably regarding charging to facilitate description.

Before beginning the description of the operational effects of the wireless charging system 20 including the electric vehicle 10 and external charging device 14 which are basically configured as described above, results of preliminary experimentation and discussion thereof will be described, to facilitate understanding of the present disclosure.

Preliminary Experimentation Results and Discussion

Figure 3:
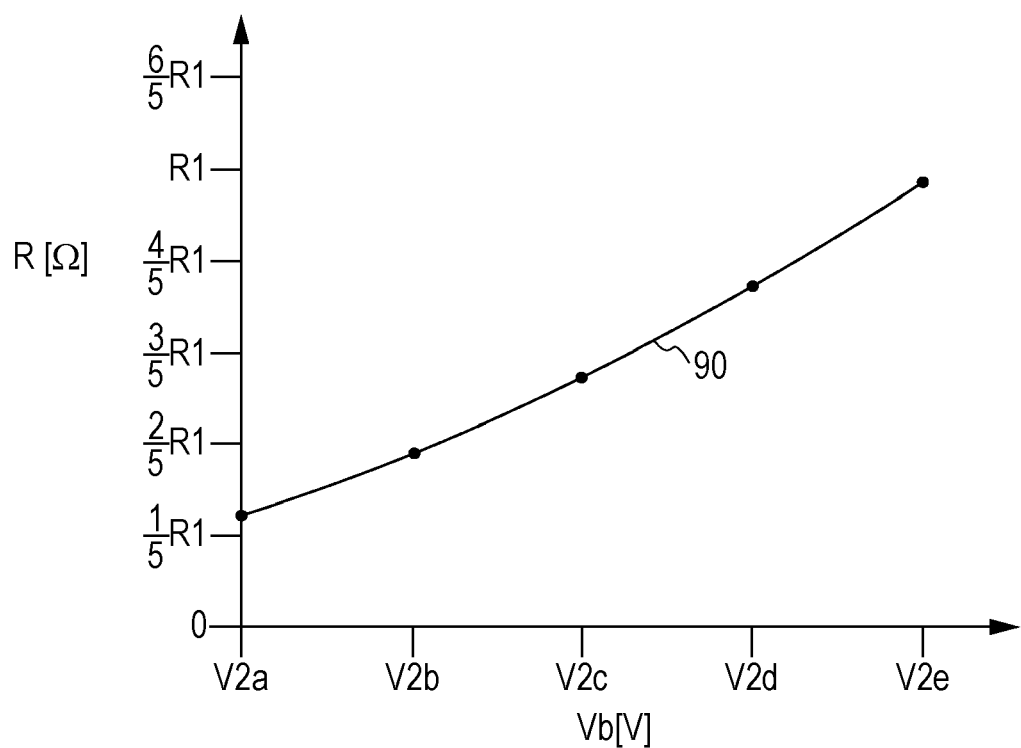
FIG. 3 is a properties diagram illustrating change in a load resistance value as to load voltage (battery voltage).

In the magnetic resonance wireless charging system 20 illustrated in FIG. 2, the efficiency η calculated as the ratio of the secondary power P2 as to the primary power P1 is known to depend on load resistance value R as in the following Expression (1). Note that the load resistance value R is not only the internal resistance of the battery 12, but also the resistance at the battery 12 side as seen from the input side of the rectifier 52.

$$\eta = 100 \times R/[R + r2 + r1(R/x0)^2] \quad (1)$$

where

η: efficiency (%)
R: load resistance value (Ω)
r2: coil resistance of secondary coil L2
r1: coil resistance of primary coil L1
x0: excitation reactance FIG. 3 illustrates a property 90 of calculated values of battery voltage Vb (battery voltage) and load resistance value R with the load power P2 set to the maximum load power P2max W (e.g., electric power around several kW).

Load voltage Vb of around several hundred volts was lowered from load voltage V2e in stages, indicated by load voltage V2d, V2c, V2b, and V2a. It can be seen that the load resistance value R (Ω) drops from around load resistance value R1 to around load resistance value R1×⅘, around load resistance value R1×⅗, around load resistance value R1×⅖, and around load resistance value R1×⅕. In practice, the load voltage Vb is raised in stages from the load voltage V2a (while charging) to obtain the property 90. That is to say, the voltage is raised from the load voltage V2a in stages, to a voltage where a full charge can be realized around V2e=several hundred volts.

Figure 4:
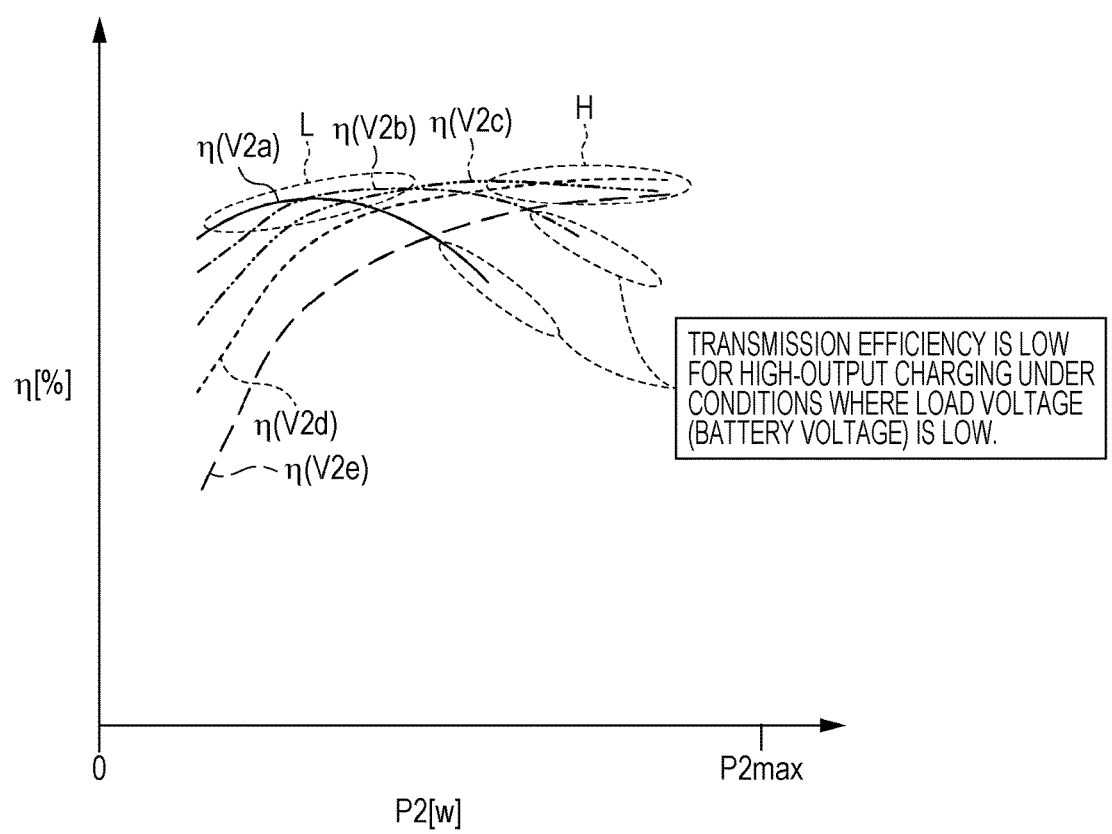
FIG. 4 is a properties diagram illustrating change in charging efficiency as to load power, with load voltage as a parameter.

FIG. 4 illustrates properties η(V2a), η(V2b), η(V2c), η(V2d), and η(V2e) of the calculated value of efficiency η (η=100×P2/P1) when load power P2 is changed from 0 W to the maximum voltage P2max, with load voltage Vb (Vb=V2a<V2b<V2c<V2d<V2e) as a parameter. It can be understood that under conditions where the load voltage Vb, i.e., the battery voltage Vb is low, such as where Vb=2Va, Vb=2Vb, or the like, transmission efficiency (charging efficiency) η is low when the load power P2 is great, in other words, which charging under a high load.

Figure 5:
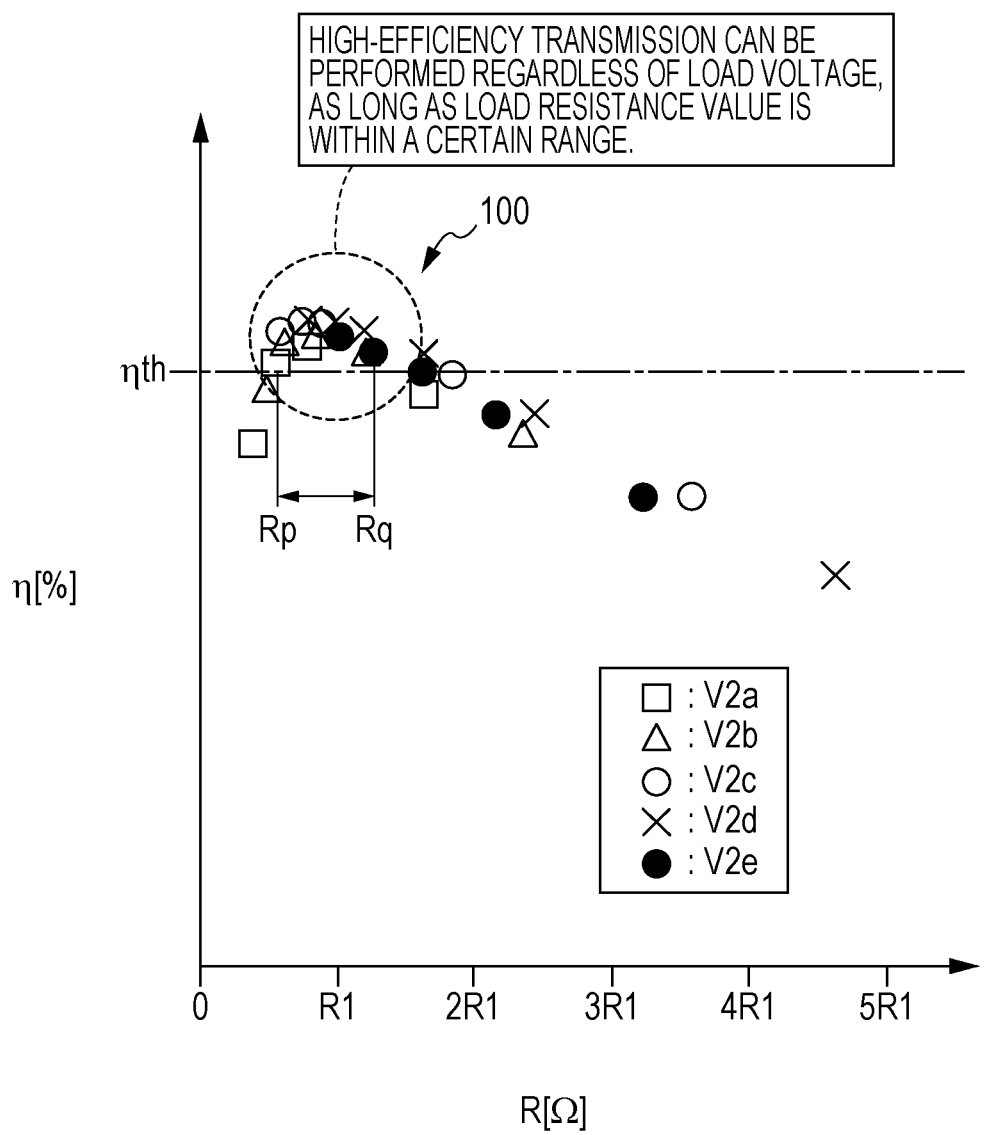
FIG. 5 is a properties diagram illustrating charging efficiency as to load resistance value, by load voltage.

FIG. 5 illustrates a property 100 of each charging efficiency η (%) for each load voltage V2 (V2a, V2b, V2c, V2d, and V2e) as to the load resistance value R as the plotted results.

It can be seen from the property 100 that in order to perform high-efficiency (e.g., 90% or higher) transmission for η% of η=ηth (called lower limit of charging efficiency setting) for example, high-efficiency transmission can be performed regardless of the load voltage V2 (V2a, V2b, V2c, V2d, and V2e), as long as the load resistance value R is within the range of Rp to Rq (the value of a representative value R1 was several tens of ohms, for example).

It should be noted that the curve of property 100 in FIG. 5 generally corresponds to the form represented by Expression (1) above.

From the results of the preliminary experimentation described above, it can be understood that in the magnetic resonance wireless charging system 20, effecting control such that the load resistance value (load resistance) R is constant (within the range of Rp to Rq) at the time of charging the battery 12, R is controlled such that R=R1 in this embodiment. Accordingly, charging of the battery 12 is continued at a value where the charging efficiency η is the highest, charging at a load resistance value R where charging efficiency η is low, and drop of the charging efficiency η was successfully suppressed over the entire period from starting charging to completion of charging.

First through fourth exemplary embodiments based on the above-described Preliminary Experimentation Results and Discussion will be described with reference to the flowcharts in FIGS. 6 through 9 carried out by the control device 42.

It is assumed in the following first through fourth exemplary embodiments that the reception antenna 50 of the electric vehicle 10 and the transmission antenna 30 are facing one another, the vehicle is in a stopped or parked state, and a driving source such as the engine and/or motor generator 58 is not operating. It is also assumed that the display device 64, audio output device 65, charge request switch 66, and other like accessories, are in a standby state.

First Embodiment (Ensuring Constant-Resistance Charging)

Constant-resistance (CR) charging control, high-efficiency control, and upper limit control of chargeable current, will be described in this first exemplary embodiment with reference to the flowchart in FIG. 6.

Figure 6:
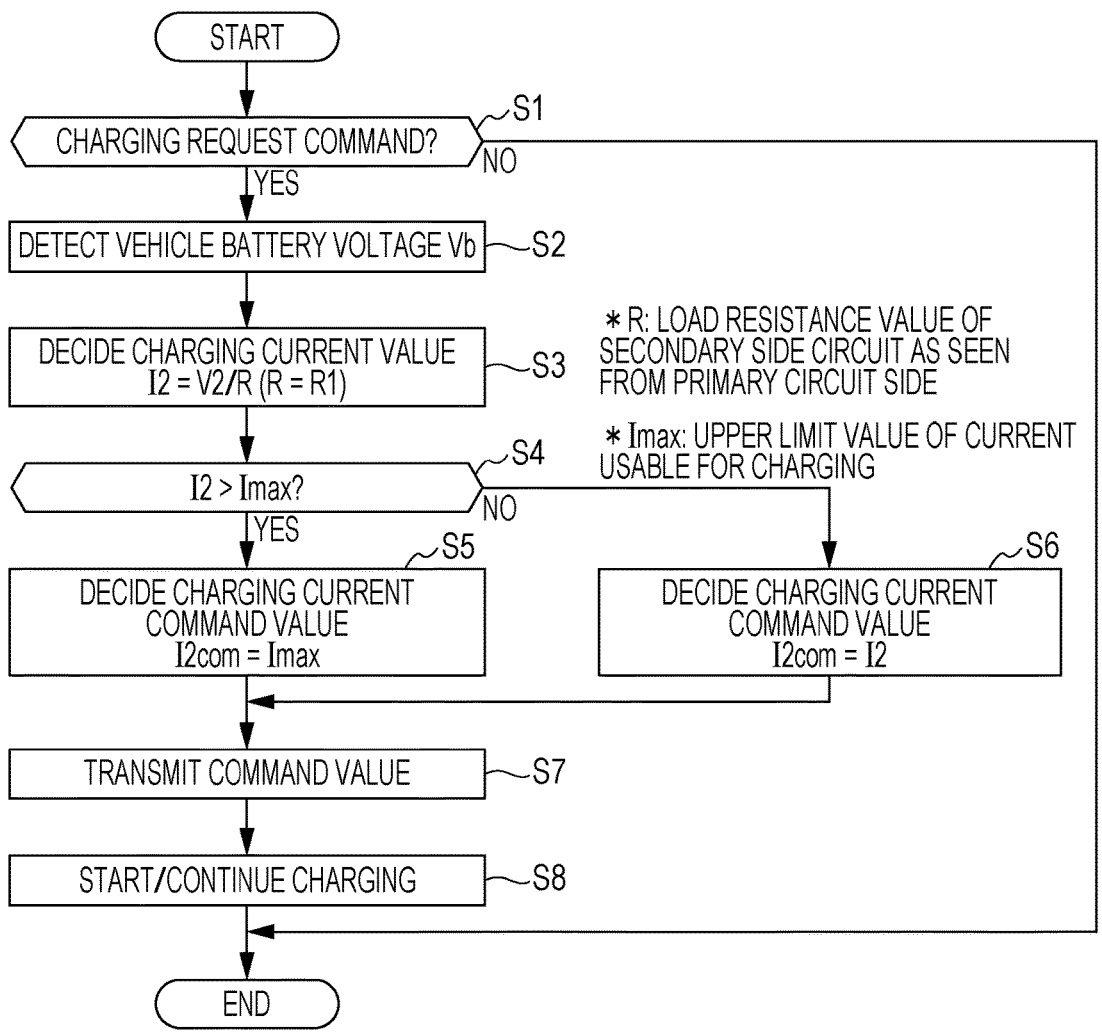
FIG. 6 is a flowchart of processing to decide a charging current command value so as to ensure constant-resistance charging, according to a first exemplary embodiment.

In step S1 in FIG. 6, the control device 42 determines whether or not there has been a command from the external control device 26 or a charging request command by pressing the charge request switch 66. In a case where there has been a charging request command (YES in step S1), the battery voltage detecting unit 81 detects the battery voltage Vb of the battery 12 of the electric vehicle 10 in step S2. Once charging is started, the secondary voltage V2 of the input side of the rectifier 52 is actually detected as the battery voltage Vb of the battery 12. Also in step S2, rated capacity P1r (P1r=I1r×V1, where I1r is upper limit value of primary side current) of the AC power source device 22 is received from the external control device 26 via the communication device 32 and communication device 68, and stored.

Next, in step S3, in order to realize constant-resistance charging, the value of the charging current value I2 (also referred to as charging current value I2) which is the secondary current serving as the charging current command value (charging current value) is set as shown in the following Expression (2).

$$I2=V2/R=V2/R1 \qquad (2)$$

where
I2: charging current
V2: secondary voltage (V2=Vb)
R1: representative value of load resistance value where transmission efficiency η is η=ηth or greater (see FIG. 5)

Next, in step S4 determination is made regarding whether or not the charging current value I2 has exceeded Imax which is the upper limit value of chargeable current restricted at the electrical reception circuit 40 side.

This determination can be made as follows. Taking into consideration that the transmission efficiency η is η=ηth, when secondary power P2 is P2=I2×V2, so this can be converted into primary power P1, and compared with the rated capacity P1r (P1r=I1r×V1, where I1r is upper limit value of primary side current) of the AC power source device 22.

In this case, the following Expression (3) holds.

$$P1r=I1r \times V1=P2/(\eta th/100)=Imax \times V2/(\eta th/100) \qquad (3)$$

Solving Expression (3) regarding the chargeable current upper limit value Imax yields Expression (4).

$$Imax=I1r \times V1 \times \eta th/(100 \times V2) \qquad (4)$$

If the determination of step S4 is positive (Yes in step S4), a charging current command value I2com is decided as I2com=Imax in step S5.

If the determination of step S4 is negative (No in step S4), in step S6 the charging current command value I2com is decided as the charging current value I2 calculated in step S3 (I2com=I2).

In step S7, the charging current command value I2com thus decided is sent to the external control device 26 via the communication device 68 and communication device 32.

Next, in step S8, charging of the battery 12 is started, and thereafter charging is continued in step S8 while returning to step S1 every certain amount of time, as illustrated in the following second through fourth exemplary embodiments.

The external control device 26 changes the PWM control duty of the inverter making up the converter/inverter block 28 such that the charging current value I2 detected at the charging current detecting unit 83 becomes the charging current command value I2com, in accordance with the charging current command value I2com that has been decided.

While not illustrated, the charging is completed or interrupted when fully charged or when the charging request command in step S1 is cancelled.

Second Exemplary Embodiment (High-Efficiency Charging and Handling Displacement)

In the second exemplary embodiment, description will be made regard to processing in a case of stopping high-efficiency charging, and processing to handle displacement between the transmission antenna 30 and reception antenna 50, with reference to the flowchart in FIG. 7.

Figure 7:
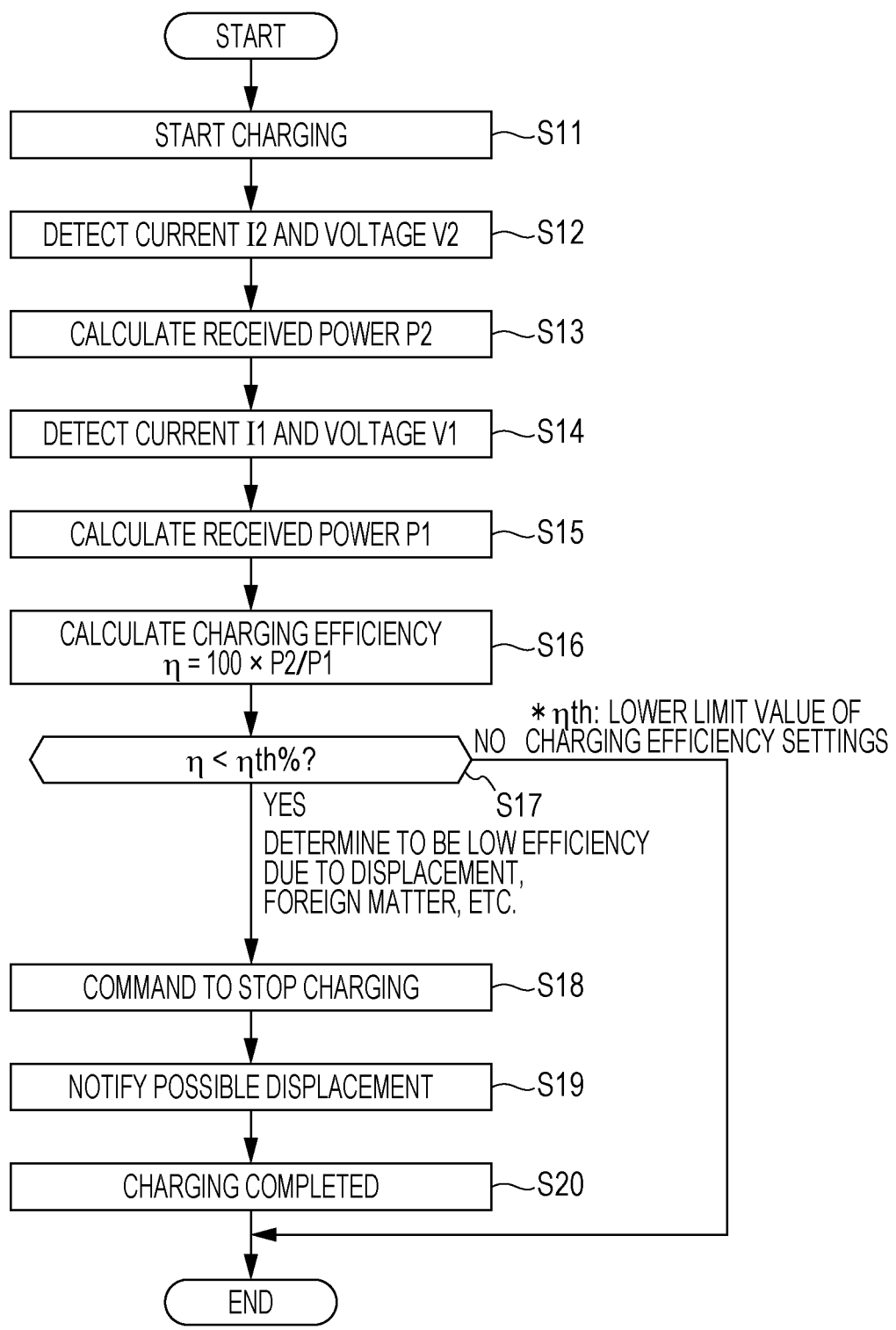
FIG. 7 is a flowchart of processing to notify of possibility of displacement beforehand, to continue highly efficient charging, according to a second exemplary embodiment.

Charging is started in step S11 in FIG. 7, which corresponds to the processing in step S8 in FIG. 6, and in step S12 the charging current detecting unit 83 detects the charging current value I2 and the load voltage detecting unit 84 detects the load voltage Vb (V2).

Next, the load voltage calculating unit 85 calculates the load power P2 which is the received power, in step S13 (P2=I2×V2).

Next, in step S14 the primary current I1 detected by the electric transmission current detecting unit 73 of the external control device 26, and the primary voltage V1 detected by the electric transmission voltage detecting unit 74, are detected via the communication device 32 and communication device 68.

In step S15, the electric transmission power calculating unit 86 calculates the transmitted power P1 (P1=×V1).

In step S16, the charging efficiency calculating unit 87 calculates the transmission efficiency η of the charging currently in progress (η=100×P2/P1).

Next, in step S17, determination is made regarding whether or not the calculated transmission efficiency η is below a charging efficiency setting threshold value (lower limit of charging efficiency setting) ηth, and if not (No in step S17, that is, η≥ηth), charging is continued.

On the other hand, in a case where the calculated transmission efficiency η is below the charging efficiency setting threshold value ηth in step S17 (Yes in step S17, that is, η<ηth), this determination is made that the position of the reception antenna 50 and transmission antenna 30 is displaced, or the efficiency η has dropped due to a nearby foreign object (magnetic material or the like). In step S18, a charging stop command is issued, which is transmitted to the external control device 26 via the communication device 68 and communication device 32. At this time, the external control device 26 sets the duty of the PWM signal driving the inverter making up the converter/inverter block 28 to 0%, thus stopping supply of electric power to the transmission antenna 30.

In the following step S19, the control device 42 makes notification by an announcement (audio guide) from the audio output device 65 such as "The reception antenna may be off-position. Please move the vehicle so the reception antenna and transmission antenna face each other." and the flow advances to step S20 where the charging ends. Alternatively an arrangement may be made where the control device 42 is provided with a telephone function, and notifies the user of the announcement (audio guide) through a mobile terminal (cellular phone, smartphone, etc.) of the user.

Third Exemplary Embodiment (Selection Processing by User to Switch Between Constant-Resistance Charging and Constant Power Charging)

In the third embodiment, processing for the user to select switching between the constant-resistance charging according to the present embodiment, and constant power charging processing according to the related art, will be described with reference to the flowchart in FIG. 8.

Figure 8:
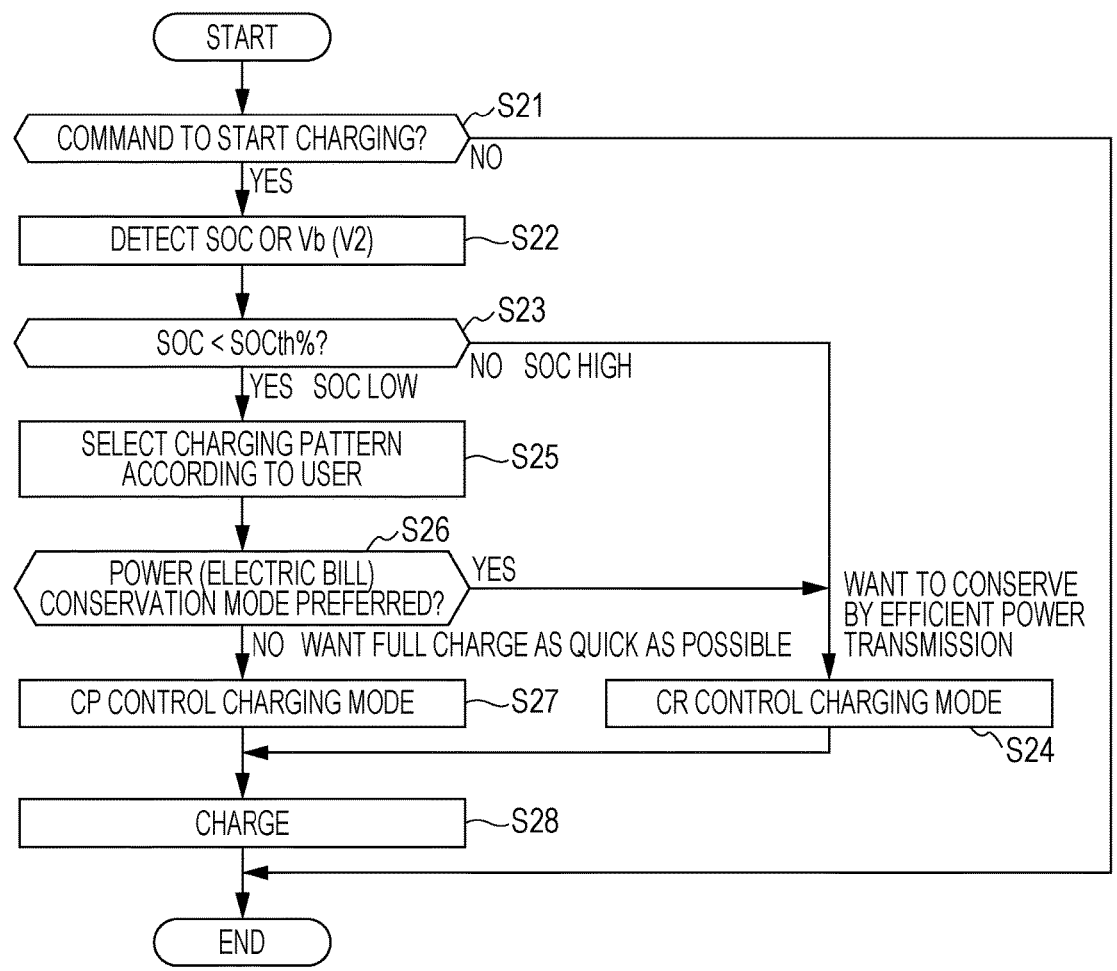
FIG. 8 is a flowchart of processing for the user to select switching between constant-resistance charging and constant voltage charging, according to a third exemplary embodiment.

In step S21 in FIG. 8, the control device 42 determines whether or not there has been a command from the external control device 26 or a charging request command by pressing the charge request switch 66. In a case where there has been a charging request command (YES in step S21), the battery voltage detecting unit 81 detects the battery voltage Vb of the battery 12 of the electric vehicle 10 in step S22.

Note that SOC which is the remaining charge may be detected instead of the battery voltage Vb. This SOC may be calculated by setting the full-charged capacity (rated capacity) as a 100% SOC, and subtracting the amount of power used at the battery 12 from this full-charged capacity.

Next, in step S23 determination is made regarding whether or not the SOC is smaller than a remaining-charge threshold value SOCth.

In a case where the SOC is not smaller than the remaining-charge threshold value SOCth (SOC SOCth), in other words, in a case where the battery voltage Vb is high, the load power P2 can be increased as illustrated by the region H surrounded by the dotted line in FIG. 4, and charging can be performed with high efficiency. Accordingly, charging in the charging mode according to constant-resistance charging control (CR control) described regarding step S3 in the first embodiment is decided to be performed, and in step S28 constant-resistance charging processing is performed.

In a case where the determination in step S23 is that the SOC is smaller than the remaining-charge threshold value SOCth (SOC<SOCth), in step S25 the user performs selection processing of the charging pattern.

In this case, the user is queried via the screen of the display device 64 regarding whether or not the user desires a conservational charging mode which conserves electric power (electric bill), in the form of selecting between Yes or No. An audio output (announcement) is preferably used as guidance at the same time.

In a case where the user has selected Yes on the display device 64 (Yes in step S26), determination is made that the user desires to perform efficient power transmission and conserve. Alternatively, an arrangement may be made wherein the charging mode under CR control of step S24 is selected after a predetermined amount of time has elapsed. The charging processing is then started in step S28.

On the other hand, in a case where the user has selected No on the display device 64 within a predetermined amount of time (No in step S26), determination is made that the user desires to charge to full as fast as possible. Accordingly, the charging mode under constant power (CP) control is used, and constant power charging processing is performed in step S28.

In a case where the user has selected neither Yes nor No in the determination in step S26, the flow automatically transitions to the charging mode under CR control of step S24 after a certain amount of time has elapsed after the display of Yes or No on the display device 64, so that interruption or cancellation of the charging processing does not occur.

Fourth Exemplary Embodiment (Automatic Selection Processing to Switch Between Constant-Resistance Charging and Constant Power Charging)

In the fourth embodiment, processing for automatic selecting of switching between the constant-resistance charging processing according to the present embodiment, and constant power charging processing according to the related art, will be described with reference to the flowchart in FIG. 9.

Figure 9:
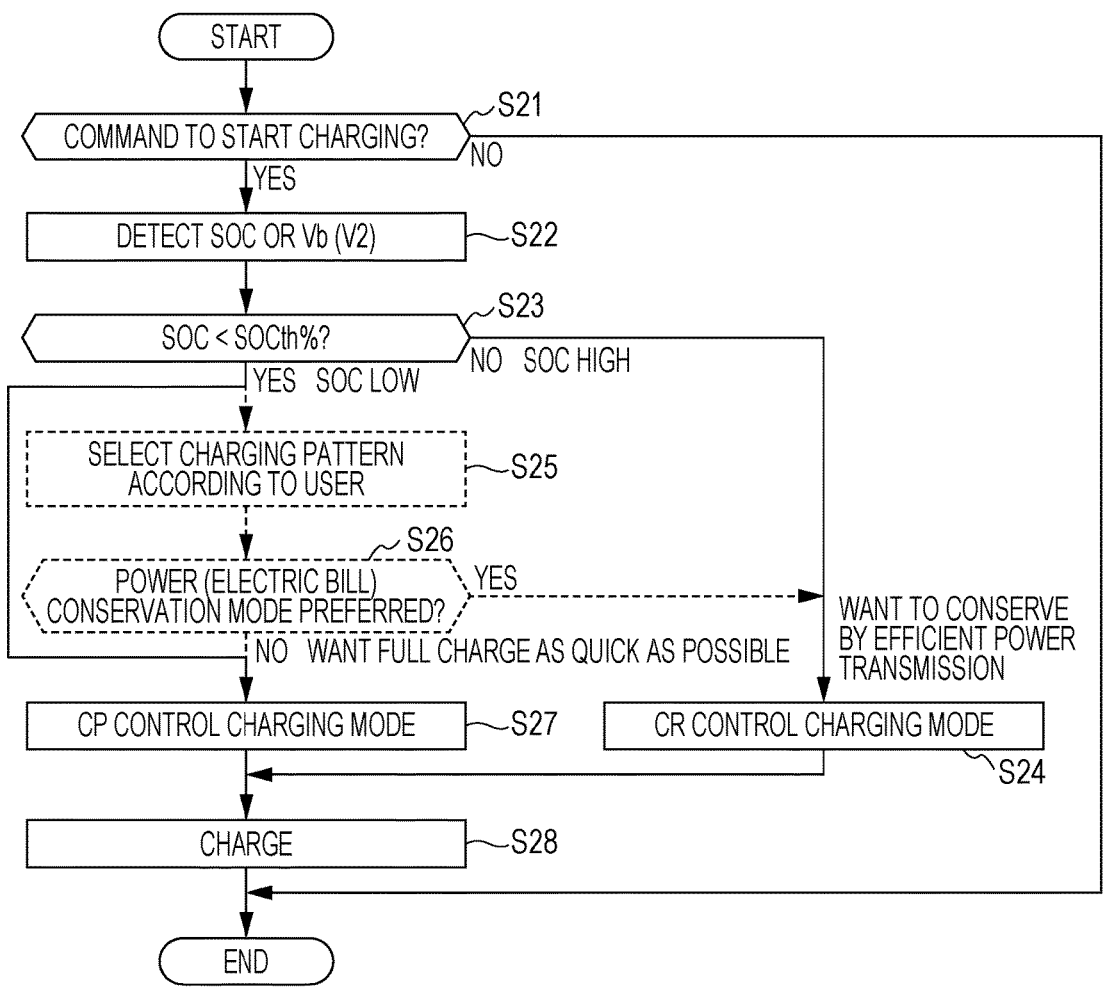
FIG. 9 is a flowchart of processing for automatic selection of switching between constant-resistance charging and constant voltage charging, according to a fourth exemplary embodiment.

The flowchart illustrated in FIG. 9 (fourth embodiment) is the same as the flowchart illustrated in FIG. 8 (third embodiment) but the processing of steps S25 and S26, indicated by dashed lines, has been omitted.

In the flowchart in FIG. 9, in a case where the determination processing of step S23 is positive step S23 (SOC<SOCth), that is to say in a case where the SOC is smaller than the remaining-charge threshold value SOCth, the charging mode by CP control in step S27 is automatically selected, taking into consideration shortening the charging time till fully charged. In a case where determination processing of step S23 is negative (No in step S23, SOC SOCth), in other words in a case where the SOC is greater than the remaining-charge threshold value SOCth, the charging mode by efficiency CR control is selected and charging is performed.

Review of Embodiment

Figure 10:
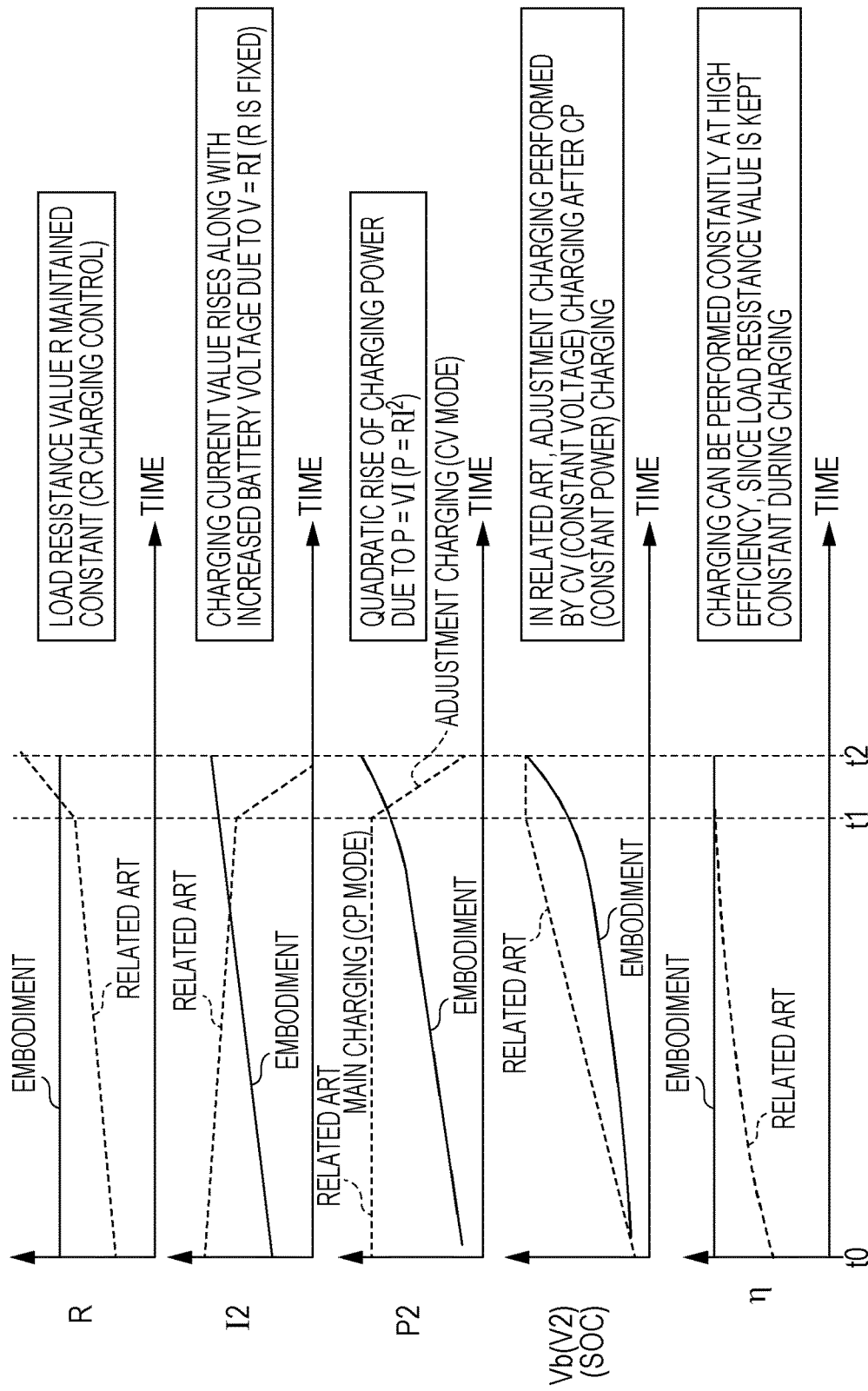
FIG. 10 is a time chart for describing comparison between the related art and charging control according to the present embodiment.

Now, the related art and the present embodiment will be compared through description with reference to the time chart in FIG. 10.

In FIG. 10, in a case where the SOC (battery voltage V2) is low, in the related art the charging mode by CP control (where P2 is constant, constant power charging processing) is selected as the charging mode of the main system from point-in-time t0 to t1. Upon the battery voltage Vb nearing the voltage corresponding to full-charge at point-in-time t1, the charging mode by CV control (constant voltage charging processing) is selected as the charging mode, and adjusted charging is performed where the charging power P2 is gradually reduced to point-in-time t2.

In this related art, the load resistance value R gradually increases from point-in-time t0 to t1, and rapidly increases from point-in-time t1 to t2.

On the other hand, in the present embodiment, CR charging control is performed where the load resistance value R is maintained constant. Charging control is performed in CR charging control such that the load resistance value R is constant (R=R1), so the charging power (load power, received power) P2 has to be increased, but the increase in transmitted power P1 (see step S15) makes up for the increase in charging power P2.

As the battery voltage Vb (secondary voltage V2) increases due to charging, the secondary current I2 needs to be increased from the relation R1=V2/I2 according to Expression (2) in order to maintain the load resistance value R at a constant value R1. That is to say, as the battery voltage Vb (secondary voltage V2) increases, the charging power P2=V2×I2 has to be increased in order to maintain the load resistance value R at a constant value R1.

Figure 11:
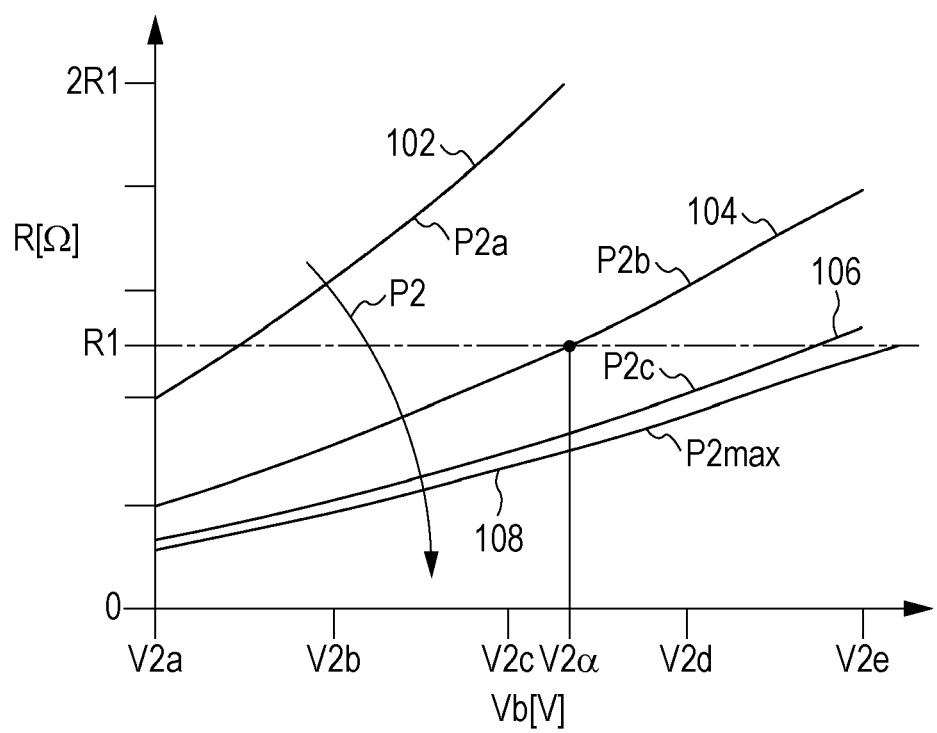
FIG. 11 is a properties diagram illustrating the relation between battery voltage and load resistance value, with charging power as a parameter.

FIG. 11 illustrates the relation between the battery voltage Vb (V2) and load resistance value R with the charging power P2 as a parameter. It can be seen that the charging power P2 has to be increased as indicated by charging power P2a, P2b, P2c, P2max, corresponding to secondary power P2 properties 102, 104, 106, and 108, in accordance with the increase in battery voltage Vb (V2).

For example, it can be seen that at battery voltage V2a, the secondary voltage P2 should be set to secondary voltage P2b of property 104. The control device 42 may store a properties map including the properties 102, 104, 106, and 108 illustrated in FIG. 11, so that the charging current value setting unit 82 references the properties map to decide the charging current value I2 described in step S3. In practice, the charging power P2a for property 102 is a power value around 1 kW, and the charging power P2max for property 108 is around several kW.

As illustrated in FIG. 10, in the related art the charging current value I2 gradually drops from point-in-time t0 to t1 due to increase in battery voltage Vb, and rapidly drops from point-in-time t1 to t2 since rise in battery voltage Vb is suppressed.

On the other hand, in the CR charging control according to the present embodiment, the load resistance value R is fixed by V=R×I, so the charging current value I2 gradually increases as the battery voltage Vb rises. The charging power P2 increases quadratically in accordance with P=V×I=R×I².

In the related art, the battery voltage Vb is maintained at a constant during adjusted charging under CV charging, after having gradually increased during CP charging. On the other hand, the battery voltage Vb increases generally quadratically according to the technology of the present embodiment.

In the related art, the charging efficiency η drops during the CP charging mode, but the CR charging mode according to the present embodiment allows charging to be continuously performed at a highly efficient region (η>ηth), since the load resistance value R is maintained at a constant from point-in-time t0 through t2.

As described above, the electric vehicle 10 according to the present embodiment includes a charging circuit configured including at least the reception coil L2 which receives AC power transmitted from the external electrical transmission circuit 16 by wireless power transmission, the battery 12 which charges power P2 obtained by rectifying the AC power that has been received at the reception coil L2. That is to say, the electric vehicle 10 according to the present embodiment includes at least the electrical reception circuit 40 and battery 12.

The electric vehicle 10 includes the control device 42, which includes the battery voltage detecting unit 81 for detecting the battery voltage Vb and the charging current value setting unit 82 which sets the charging current value I2 to charge the battery 12 with, in accordance with the battery voltage Vb detected by the battery voltage detecting unit 81.

The control device 42 sets the charging current value I2 so that the load resistance value R of the charging circuit is constant when charging to the battery 12 is continued.

Thus, the present embodiment has been configured such that the charging current value I2 can be set by the charging current value setting unit 82 according to the battery voltage Vb, so the charging current value I2 can be set such that the load resistance value R of the charging circuit is a constant value where the charging efficiency is maintained at a high level, according to the battery voltage Vb.

Accordingly, trouble where the battery 12 continues to be charged at a load resistance value R where the charging efficiency η is poor can be suppressed, and dropping of the charging efficiency η can be suppressed for the entire period from starting charging to completion of charging.

Also, the control device 42 sets the charging current value I2 so that the load resistance value R of the charging circuit is constant based on the battery voltage Vb, so additional hardware is not necessary, and complexity of the system configuration and circuit configuration can be suppressed.

The control device 42 preferably sets the charging current value I2 such that so that the load resistance value R of the charging circuit is a value where the charging efficiency η to the charging circuit is highest (in the present embodiment, load resistance value R1). Alternatively, an arrangement where the charging current value I2 is set such the charging efficiency η to the charging circuit is equal to or greater than a threshold value (charging efficiency setting lower limit value ηth) is also encompassed in the scope of the present disclosure.

Preferably, the control device 42 determines whether or not the charging current value I2 is greater than the chargeable current upper limit value Imax permitted for charging the battery 12 (Step S4), and in a case where the charging current value I2 is greater than the chargeable current upper limit value Imax, charging is performed at the chargeable current upper limit value Imax, while in a case where the charging current value I2 is not greater than the chargeable current upper limit value Imax, charging is performed at the charging current value I2. That is to say, in a case where the charging current value I2 exceeds the chargeable current upper limit value Imax, charging is performed at the chargeable current upper limit value Imax so as to protect the charging circuit and perform charging at a relatively high charging efficiency η. On the other hand, in a case where the charging current value I2 is within the chargeable current upper limit value Imax, charging is performed at the highest charging efficiency η.

Also, the control device 42 can avoid charging at low charging efficiency η by obtaining information of the transmitted power P1 (V1, I1) from the electrical transmission circuit 16 side, and stopping charging in a case where the charging power P2 as to the transmitted power P1 is below the charging efficiency setting lower limit value ηth (Yes in step S17).

The user is notified when stopping charging that the positions of the power supply coil L1 and reception coil L2 may be displaced, thus prompting the user to correct the position of the electric vehicle 10. If the position is corrected, charging can be continued at high charging efficiency η.

Further in a case where the SOC or the battery voltage Vb correlated with the SOC is at or above a threshold, the control device 42 sets the charging current value I2 so that the load resistance value R of the charging circuit is constant when charging the battery 12 (step S24), and in a case where the SOC (or battery voltage Vb) is below the threshold SOCth, performs settings such that the charging power P2 of the charging circuit is constant (step S27).

Accordingly, in a case where the SOC (or battery voltage Vb) is at or above the threshold SOCth, charging starts in a state where the charging power P2 is relatively high, so extended charging time can be suppressed while suppressing drop in charging efficiency η.

Also, in a case where the SOC (or battery voltage Vb) is below the threshold SOCth, charging starts in a state where the charging power P2 is relatively low, so extended charging time can be suppressed by performing constant power charging (charging under CP control).

In this case, the efficiency η for constant power charging is low when the SOC (or battery voltage Vb) is low, so in a case where the SOC (or battery voltage Vb) is below the threshold SOCth, so preferably, a charging current value I2 is set such that the load resistance value R of the charging circuit is constant, or notification is made to the user to select a setting so that the charging power P2 of the charging circuit is constant (step S25).

It should be noted that the present disclosure is not restricted to the above-described embodiments, and that various configurations may be made based on the description in the present specification.

An electric vehicle according to the present disclosure includes: a charging circuit including at least a reception coil configured to receive, by wireless power transmission, AC power transmitted from an electrical transmission circuit outside of the vehicle, and a battery which is charged with power obtained by rectifying the AC power received by the reception coil; and a control device including a battery voltage detecting unit configured to detect voltage of the battery, and a charging current value setting unit configured to set a charging current value at which to charge the battery, in accordance with the voltage of the battery detected by the battery voltage detecting unit. The control device sets the charging current value so that a load resistance value of the charging circuit is constant, at the time of continuing charging of the battery.

According to this configuration, the charging current value setting unit can set the charging current value in accordance with the voltage of the battery, so the charging current value can be set such that the load resistance value of the charging circuit is constant at a value where the charging efficiency is maintained high, in accordance with the voltage of the battery.

Accordingly, a situation can be avoided where charging at a load resistance value where charging efficiency is low is performed when continuing charging of the battery, and dropping of charging efficiency can be suppressed for the entire period from starting charging to completion of charging.

Also, the control device sets the charging current so that the load resistance value of the charging circuit is constant based on the battery voltage, so additional hardware is not necessary, and complexity of the system configuration and circuit configuration can be suppressed.

The control device preferably sets the charging current such that so that the load resistance value of the charging circuit is a value where the charging efficiency to the charging circuit is highest. Alternatively, an arrangement where the charging current is set such the charging efficiency to the charging circuit is equal to or greater than a threshold value (charging efficiency setting lower limit value) is also encompassed in the scope of the present disclosure.

The control device may determine whether or not the charging current is greater than the chargeable current upper limit value permitted for charging the battery, and in a case where the charging current is greater than the chargeable current upper limit value, charging is performed at the chargeable current upper limit value, while in a case where the charging current is not greater than the chargeable current upper limit value, charging is performed at the charging current. That is to say, in a case where the charging current exceeds the chargeable current upper limit value, charging is performed at the chargeable current upper limit value so as to protect the charging circuit and perform charging at a relatively high charging efficiency. On the other hand, in a case where the charging current is within the chargeable current upper limit value, charging is performed at the highest charging efficiency.

Also, the control device can avoid charging at low charging efficiency by obtaining information of the transmitted power from the electrical transmission circuit side, and stopping charging in a case where the charging power as to the transmitted power is below the charging efficiency setting lower limit value.

When stopping the charging, the user may be notified when stopping charging that the positions of the power supply coil and reception coil might be displaced, thus prompting the user to correct the position of the electric vehicle. If the position is corrected, charging can be continued at high charging efficiency.

Further in a case where the state of charge (SOC) representing in percent the remaining charge as to the rated charging capacity of the battery, or the battery voltage correlated with the SOC is at or above a threshold, the control device may set the charging current so that the load resistance value of the charging circuit is constant when charging the battery, and in a case where the SOC or battery voltage is below the threshold, perform settings such that the charging power of the charging circuit is constant.

Accordingly, in a case where the SOC or battery voltage is at or above the threshold, charging starts in a state where the charging power is relatively high, so extended charging time can be suppressed while suppressing drop in charging efficiency.

Also, in a case where the SOC or battery voltage is below the threshold, charging starts in a state where the charging power is relatively low, so extended charging time can be suppressed by performing constant power charging.

In this case, the efficiency for constant power charging is low when the SOC or battery voltage is low, so in a case where the SOC or battery voltage is below the threshold, preferably, the charging current is set such that the load resistance value of the charging circuit is constant, or notification is made to the user to select a setting so that the charging power of the charging circuit is constant so that the charging time will be shorter.

Obviously, numerous modifications and variations of the present invention are possible in light of the above teachings. It is therefore to be understood that within the scope of the appended claims, the invention may be practiced otherwise than as specifically described herein.

What is claimed is:
1. An electric vehicle comprising:
   a charging circuit including at least
      a reception coil configured to receive, by wireless power transmission, AC power transmitted from an electrical transmission circuit outside of the vehicle, and
      a battery which is charged with power obtained by rectifying the AC power received by the reception coil; and
   a control device including:
      a battery voltage detecting unit configured to detect voltage of the battery, and
      a charging current value setting unit configured to set a charging current value at which to charge the battery, in accordance with the voltage of the battery detected by the battery voltage detecting unit;
   wherein the control device is configured to set the charging current value by increasing the charging current value over time while the voltage of the battery increases so that a load resistance value of the charging circuit is constant in a constant-resistance charging mode, at the time of continuing charging of the battery, the control device being configured to initiate the constant-resistance charging mode based on a determination by the control device that a state of charge (SOC) of the battery or the voltage of the battery is at or above a predetermined threshold value, or based on an input from a user,
   wherein the control device is configured to initiate a constant-power control charging mode in which charging power of the charging circuit is constant when charging the battery based on a determination by the control device that the SOC of the battery or the voltage of the battery is below the predetermined threshold value, and
   wherein the control device is configured to, based on the input from the user, select between the constant-resistance charging mode and the constant-power control charging mode.

2. The electric vehicle according to claim 1,
wherein the control device sets the charging current value so that the load resistance value of the charging circuit is a value where charging efficiency to the charging circuit is maximal.

3. The electric vehicle according to claim 1,
wherein the control device
determines whether or not the charging current value is greater than a chargeable current upper limit value permitted for charging the battery,
performs charging at the chargeable current upper limit value in a case where the charging current value is greater than the chargeable current upper limit value, and
performs charging at the charging current value in a case where the charging current value is not greater than the chargeable current upper limit value.

4. The electric vehicle according to claim 1,
wherein the control device
sets the charging current value where the load resistance value of the charging circuit is constant when charging the battery, in a case where the SOC of the battery or voltage of the battery is at or above the predetermined threshold value, and
in a case where the SOC of the battery or voltage of the battery is below the predetermined threshold value, makes notification that the user is relegated selection between
setting the charging current value where the load resistance value of the charging circuit is constant, and
performing settings such that the charging power of the charging circuit is constant.

5. The electric vehicle according to claim 1,
wherein when the control device changes the charging current value over time, the charging current value is gradually increased by an amount necessary to maintain the load resistance value of the charging circuit constant.

6. The electric vehicle according to claim 1,
wherein the control device is configured to set the charging current value so that the load resistance value of the charging circuit is constant when the power obtained by rectifying the AC power received by the reception coil increases over time.

7. The electric vehicle according to claim 1,
wherein the control device is configured to initiate the constant-resistance charging mode and set the charging current value so that the load resistance value of the charging circuit is constant in response to the determination that the SOC of the battery or the voltage of the battery is at or above the predetermined threshold value.

8. The electric vehicle according to claim 1,
wherein the control device is configured to initiate the constant-resistance charging mode and set the charging current value so that the load resistance value of the charging circuit is constant in response to input from the user requesting charging in accordance with a constant load resistance value.

9. The electric vehicle according to claim 1,
wherein the control device
obtains information regarding transmitted power from an electrical transmission circuit side, and
in a case where a charging power as to the transmitted power is below a charging efficiency setting lower limit value, stops the charging.

10. The electric vehicle according to claim 9,
wherein at the time of stopping the charging, the control device makes notification of the possibility that the positions of a power supply coil in the electrical transmission circuit and the reception coil may be displaced.

11. An electric vehicle comprising:
a charging circuit comprising:
a reception coil configured to receive wirelessly AC power transmitted from an electrical transmission circuit outside of the electric vehicle; and
a battery configured to be charged with power obtained by rectifying the AC power received by the reception coil; and
a control apparatus comprising:
a battery voltage detector configured to detect voltage of the battery; and
a charging current value setting device configured to set a charging current value at which the battery is charged in accordance with the voltage of the battery detected by the battery voltage detector, and configured to set the charging current value in a constant-resistance charging mode by increasing the charging current value over time while the voltage of the battery increases so that a load resistance value of the charging circuit is constant in a period during which the battery is being charged, the control apparatus being configured to initiate the constant-resistance charging mode based on a determination by the control apparatus that a state of charge of the battery or the voltage of the battery is at or above a predetermined threshold value, or based on an input from a user,
wherein the control apparatus is configured to initiate a constant-power control charging mode in which charging power of the charging circuit is constant when charging the battery based on a determination by the control apparatus that the state of charge of the battery or the voltage of the battery is below the predetermined threshold value, and
wherein the control apparatus is configured to, based on the input from the user, select between the constant-resistance charging mode and the constant-power control charging mode.

12. The electric vehicle according to claim 11,
wherein the control apparatus sets the charging current value so that the load resistance value of the charging circuit is a value where charging efficiency to the charging circuit is maximal.

13. The electric vehicle according to claim 11,
wherein the control apparatus
determines whether or not the charging current value is greater than a chargeable current upper limit value permitted for charging the battery,
performs charging at the chargeable current upper limit value in a case where the charging current value is greater than the chargeable current upper limit value, and
performs charging at the charging current value in a case where the charging current value is not greater than the chargeable current upper limit value.

14. The electric vehicle according to claim 11,
wherein the control apparatus sets the charging current value so that the load resistance value of the charging circuit is a value where charging efficiency to the charging circuit is equal to or greater than a charging efficiency setting lower limit value.

15. The electric vehicle according to claim 11,
wherein when the charging current value setting device of the control apparatus changes the charging current value over time, the charging current value is gradually increased by an amount necessary to maintain the load resistance value of the charging circuit constant.

16. The electric vehicle according to claim 11,
wherein the charging current value setting device is configured to initiate the constant-resistance charging mode and set the charging current value so that the load resistance value of the charging circuit is constant in response to the determination that the state of charge of the battery or the voltage of the battery is at or above the predetermined threshold value.

17. The electric vehicle according to claim 11,
wherein the charging current value setting device is configured to initiate the constant-resistance charging mode and set the charging current value so that the load resistance value of the charging circuit is constant in response to input from the user requesting charging in accordance with a constant load resistance value.

18. The electric vehicle according to claim 11,
wherein the control apparatus
    obtains information regarding transmitted power from an electrical transmission circuit side, and
    in a case where a charging power as to the transmitted power is below a charging efficiency setting lower limit value, stops charging.

19. The electric vehicle according to claim 18,
wherein at a time of stopping the charging, the control apparatus makes notification of a possibility that positions of a power supply coil in the electrical transmission circuit and the reception coil may be displaced.

20. The electric vehicle according to claim 11,
wherein the control apparatus
    sets the charging current value where the load resistance value of the charging circuit is constant when charging the battery, in a case where the state of charge of the battery or voltage of the battery is at or above the predetermined threshold value, and
    in a case where the state of charge of the battery or voltage of the battery is below the predetermined threshold value, makes notification that the user is relegated selection between
        setting the charging current value where the load resistance value of the charging circuit is constant, and
        performing settings such that charging power of the charging circuit is constant.

21. The electric vehicle according to claim 20,
wherein the control apparatus sets the charging current value where the load resistance value of the charging circuit is constant when charging the battery, in a case where the user selects neither setting the charging current value where the load resistance value of the charging circuit is constant nor performing settings such that charging power of the charging circuit is constant.

* * * * *